(No Model.)
D. E. ROWLAND.
POST HOLE DIGGER.
No. 568,119. Patented Sept. 22, 1896.
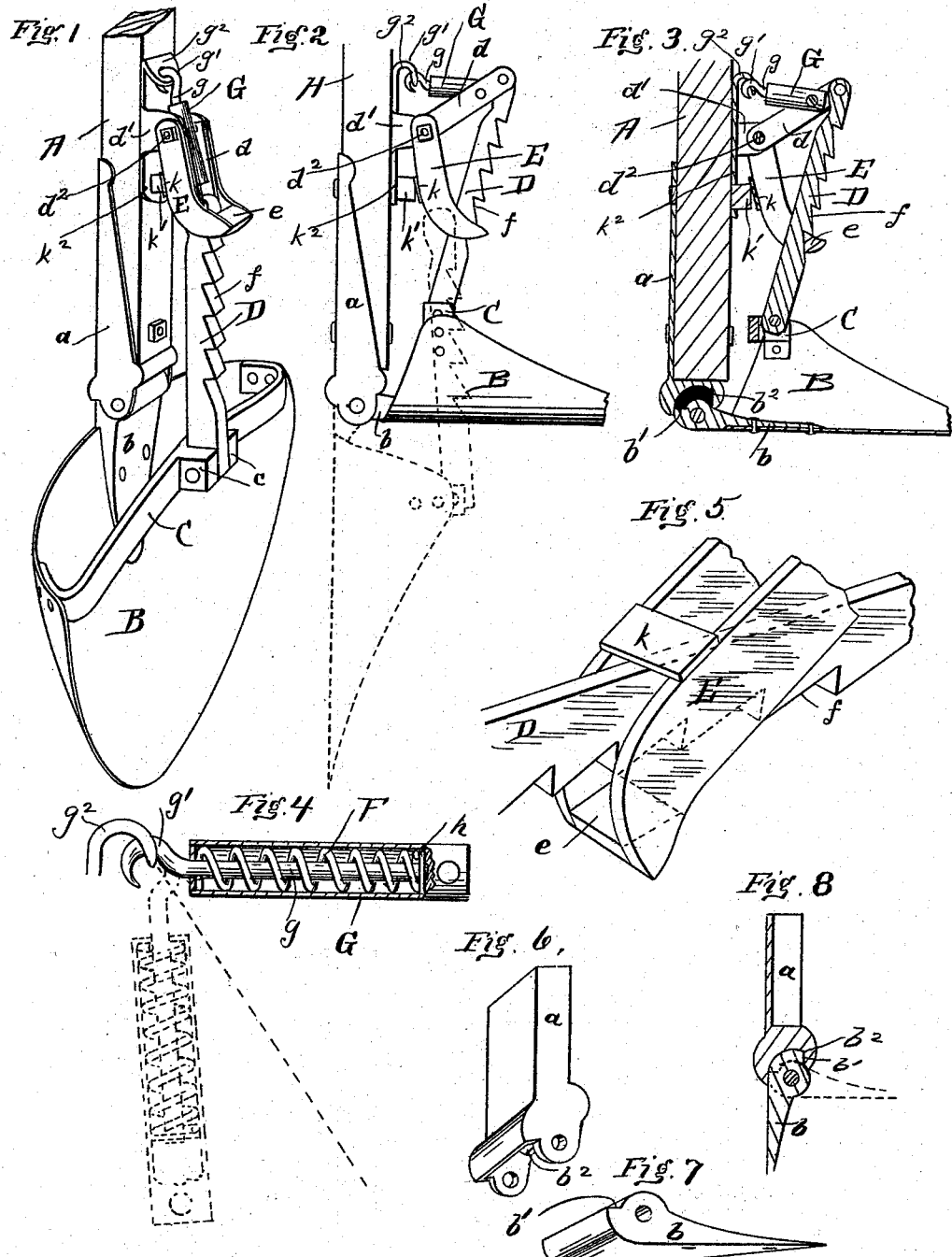
WITNESSES
C. T. Cross.
INVENTOR
David E. Rowland.
By Fred W. Bond
Attorney

UNITED STATES PATENT OFFICE.

DAVID E. ROWLAND, OF CANTON, OHIO.

POST-HOLE DIGGER.

SPECIFICATION forming part of Letters Patent No. 568,119, dated September 22, 1896.

Application filed January 31, 1896. Serial No. 577,550. (No model.)

*To all whom it may concern:*

Be it known that I, DAVID E. ROWLAND, a citizen of the United States, residing at Canton, in the county of Stark and State of Ohio, have invented certain new and useful Improvements in Post-Hole Diggers; and I do hereby declare that the following is a full, clear, and exact description of the same, reference being had to the annexed drawings, making a part of this specification, and to the letters of reference marked thereon, in which—

Figure 1 is a view showing the bottom or lower portion of the handle and illustrating the blade properly hinged thereto and the different parts belonging to the digger properly arranged, the blade placed in proper position to be entered into the ground. Fig. 2 is a view showing the blade elevated to lift the ground. Fig. 3 is a longitudinal section of the lower portion of the handle and the different parts belonging thereto, showing the blade lifted at right angles to the handle. Fig. 4 is a view of the spring-cylinder, showing the spring located therein. Fig. 5 is a view showing a portion of the clevis and the notched bar. Fig. 6 is a detached view of the handle portion of the blade-hinge. Fig. 7 is a detached view of the blade portion of the hinge. Fig. 8 is a sectional view of the hinge, showing two parts properly connected together.

Similar letters of reference indicate corresponding parts in all the figures of the drawings.

The present invention has relation to post-hole diggers; and it consists in the different parts and combination of parts hereinafter described, and particularly pointed out in the claims.

In the accompanying drawings, A represents the handle, which may be of any desired length, reference being had to the use to which the digger proper is to be put. To the bottom or lower end of the handle A is hinged the blade B, which blade is preferably of the form shown in the drawings, said blade being hinged by means of the hinge-sections $a$ and $b$, the section $a$ being securely attached to the handle A and the section $b$ securely attached to the blade B, said parts being located and arranged substantially as shown in Figs. 1, 2, and 3. To the top or upper end of the blade B and upon the concaved side thereof is securely attached the bar C, which bar is provided with the lugs or ears $c$ or their equivalents, to which lugs or ears is pivotally attached the bottom or lower end of the notched bar D, which notched bar is extended upward, and to the top or upper end thereof is pivotally attached the links $d$, and the inner ends of said links pivotally connected to the lugs or ears $d'$. To the lugs or ears $d'$ is pivotally attached the clevis or link E by means of the clamping-bolts $d^2$. The free end of the clevis or link E is provided with the catch-bar $e$, which catch-bar may be formed integral with the clevis or link E, said catch-bar being formed of such shape that it will engage the notches $f$, formed upon the notched bar D.

When it is desired to insert the blade B into the ground, said blade is placed in substantial alinement with the handle A, and for the purpose of preventing the blade B from swinging the spring F is provided, which spring is located in the cylinder G and around the bar $g$, which bar is connected at its upper end to the hook $g'$ by means of the eye $g^2$. The free end of the bar $g$ is provided with the head $h$, which head bears against one end of the spring F, the opposite end of said spring being held against the end of the cylinder G. The outer end of the cylinder G is pivotally connected to the links $d$, preferably at a point between the ends of the links $d$, thereby providing different pivotal points for the bar D and the cylinder G. It will be understood that when the blade B is turned so as to come in alinement with the handle A the spring F will be compressed, thereby causing the cylinder to be drawn upward toward the hook $g'$, which holds the clevis or link E in proper engagement with the toothed bar D when the blade B is placed in the position illustrated in Fig. 1. It will be understood that as the links $d$ are lowered the distance between the pivotal point of the cylinder G will be increased between the pivotal point of the free end of said cylinder and the hook $g'$, thereby increasing the tension of the spring, the above result being accomplished by connecting the bar $g$ a short distance above the inner pivoted ends of the link $d$.

In use the blade B is inserted into the ground, after which the handle A is moved forward at its top or upper end, which causes the clevis E to engage the next lower notch $f$, the movement of the handle being continued until the blade has been filled and brought to a horizontal position, as illustrated in Figs. 2 and 3, after which the handle, together with all of its different attachments, is elevated, together with the load located upon the blade. The blade is then dumped by turning the handle so as to bring the concaved side of the blade downward and placing the point of the blade upon the ground, at which time the clevis E is free to fall by gravity until the bar $k$ strikes the back of the toothed bar D, as illustrated in Fig. 5, at which time the blade is free to turn upon its hinge and assume the position illustrated in Fig. 1.

It will be understood that by my peculiar arrangement the handle A is not to be provided with any levers to be operated by hand, but the different parts that are employed to hold the blade B at right angles to the handle, or at any angle to the handle, are operated automatically by the oscillating movements of the handle A. For the purpose of preventing the clevis or link E from swinging at the time the blade is in the position illustrated in Fig. 1, and also in the position illustrated in Figs. 2 and 3, the projection or pin $k'$ is provided and is so located that the bar $k$ will strike the outer end of the projection or pin $k'$, as illustrated in Figs. 1, 2, and 3, said pin may be attached to the plate $k^2$, which plate is securely attached to the handle A, or, if desired, said pin may be formed separate from the plate and attached to the handle A in any convenient and well-known manner.

For the purpose of preventing the blade B from passing or moving backward, so as to bring it out of alinement with the handle A, the blade-section of the hinge $b$ is provided with the shoulder $b'$, which shoulder comes in contact with the ledge $b^2$, formed upon the handle-section of the hinge $a$.

Having fully described my invention, what I claim as new, and desire to secure by Letters Patent, is—

1. The combination of the handle A, having hinged to the bottom or lower end thereof the blade B, the bar C, secured to the concaved side of the blade, the notched bar D, pivotally connected at its bottom or lower end to the bar C, the clevis E, pivotally connected at its top or upper end, links $d$, pivotally attached to the top or upper end of the toothed bar, and a cylinder having located therein a spring, a bar located within the spring and connected to the handle, substantially as and for the purpose specified.

2. In a post-hole digger, the combination of a handle provided with a hinged blade, a hinged tooth-bar pivotally connected at its top and bottom ends, a clevis or link provided with a stop-plate, a spring connection between the handle and links, and a stop-pin secured to the handle, substantially as and for the purpose specified.

3. The combination of the handle A, having pivotally connected thereto a clevis and links, a yielding connection between the handle and links, a tooth-bar, and a clevis to engage with the teeth formed upon the bar, and a pivoted blade secured to the bottom or lower end of the handle, substantially as and for the purpose specified.

In testimony that I claim the above I have hereunto subscribed my name in the presence of two witnesses.

DAVID E. ROWLAND.

Witnesses:
F. W. BOND,
BERTHA FINCH.